June 30, 1936. S. P. MILLER 2,045,607
EXTRACTION OF PHENOLS FROM PHENOL CONTAINING LIQUORS
Original Filed Jan. 24, 1930
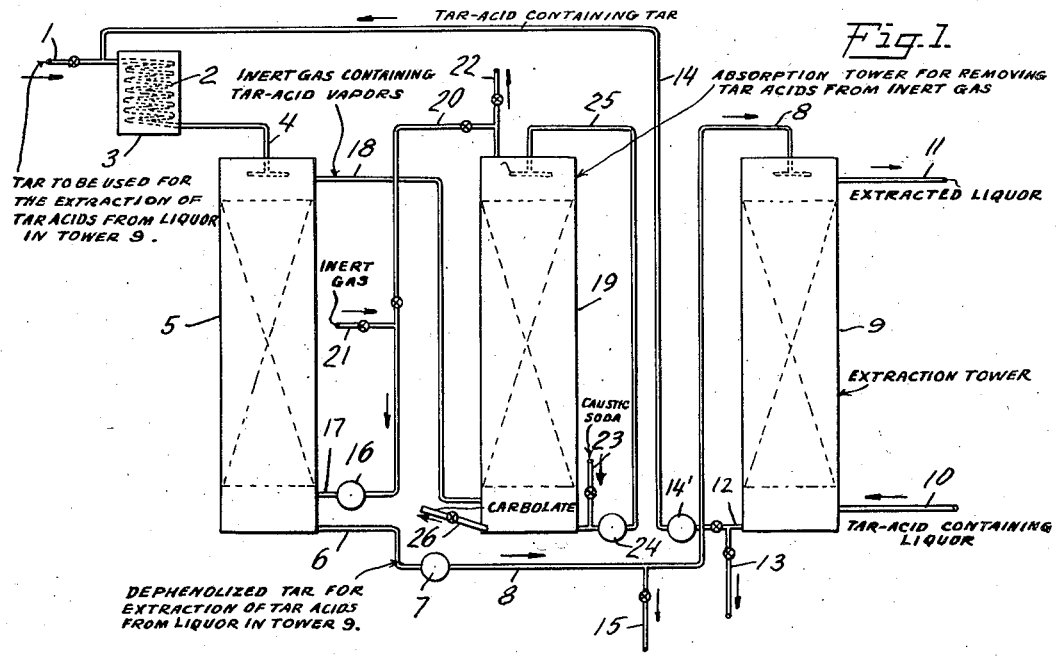
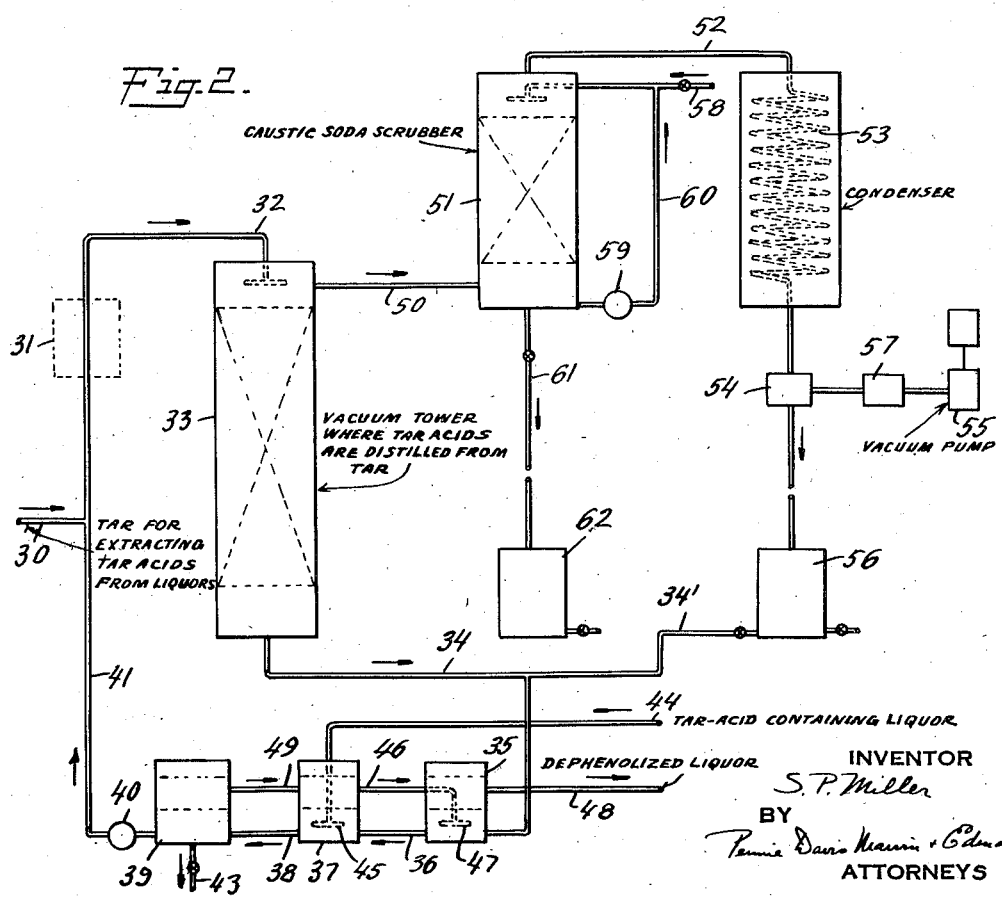
INVENTOR
S. P. Miller
BY
Pennie Davis Marvin & Edmonds
ATTORNEYS Patented June 30, 1936

2,045,607

UNITED STATES PATENT OFFICE 2,045,607

EXTRACTION OF PHENOLS FROM PHENOL-CONTAINING LIQUORS

Stuart Parmelee Miller, Scarsdale, N. Y., assignor to The Barrett Company, New York, N. Y., a corporation of New Jersey Application January 24, 1930, Serial No. 423,249
Renewed August 3, 1934

21 Claims. (Cl. 260—154)

This invention relates to an improved method of extracting phenols from phenol-containing liquors, such as ammoniacal liquors, waste liquors, and other liquors containing small amounts of phenols.

It has heretofore been proposed to extract phenols from waste liquors and other phenol-containing liquors by using benzol or other neutral oils for the extraction. The phenols are recovered from the benzol or other extraction oil by distillation, or by washing with caustic alkali which combines with the phenols to form water-soluble phenolates, leaving the oils available for further use in the process.

In a companion application, Serial No. 383,859, filed August 6, 1929, is set forth an improved process of directly extracting phenols or tar acids from tar by the use of inert gases at a temperature below the normal boiling point of the tar acid oils.

The process of the present invention makes use of tar which has been freed, to a greater or less extent, from tar acids, or of tar which is already sufficiently free therefrom, for the extraction of phenols from phenol-containing liquors.

The phenol-containing liquors which are extracted, according to the present process are liquors such as those from which phenols are customarily extracted by other processes, such as the benzol extraction process. Ammoniacal phenol-containing liquors are produced in the by-product recovery systems of coke oven and other coal distillation plants, and such liquors may be extracted to remove phenols either before the distillation of ammonia therefrom, or after such distillation. When ammoniacal liquors are subjected to distillation for the recovery of both free and fixed ammonia, lime is commonly added to set free the fixed ammonia, and in such cases, the waste liquor from the ammonia still may contain small amounts of calcium hydroxide. Such liquors may be treated by acidification, e. g. with carbon dioxide or furnace gases or other gases containing carbon dioxide which will react with any excess lime to form insoluble calcium carbonate and to set free any phenols which may be combined with the lime in the waste liquors. This step may not be necessary, since the hydrolysis of calcium salts of tar acids in warm solution may be sufficient to permit of a desired degree of extraction by tar acid solvents.

The tar which is employed for extracting phenols from the phenol-containing liquors is tar which is sufficiently low in tar acids, or tar which has itself been freed, to a greater or less extent, from tar acids or phenols, and particularly from the lower phenols. Such phenols or tar acids can readily be removed, when necessary, in accordance with the process of my said prior application by heating the tar and passing an inert gas therethrough at an elevated temperature, with resulting removal of tar acid oil vapors at a temperature considerably below their normal boiling point. By recirculation of the inert gas through the tar and then through a caustic soda scrubber at an elevated temperature, the tar acids can be removed more or less completely from the tar and recovered as a sodium salt by the caustic soda employed, as set forth in said prior application. The tar which is freed to the required extent from phenols or tar acids will be at a high temperature, for example, at a temperature in the neighborhood of the boiling point of water or somewhat higher, although it may, in some cases, be at a lower temperature.

Either total tar may be used for the extraction or a tar fraction, as, for example, the heavy tar obtained from the collector main or the collector and cross-over mains of a coke oven plant. Such heavy tar has the advantage of a relatively low content of the lower boiling tar acids which predominate in most waste liquors. The word "tar" in this patent is used to include both total tar and tar fractions.

The extraction of the phenol-containing liquor with the tar is accomplished by bringing the liquor and tar into intimate contact with each other. This may be accomplished in different types of apparatus and in a continuous or batch-wise manner. The continuous treatment has many advantages, and can be carried out in a countercurrent manner or in a series of stages so that the phenol is progressively extracted from the liquor by the tar, and so that the phenol content of the tar employed is progressively increased.

Where either the liquor or the tar is at a higher temperature than the other, the intimate contact of the tar and liquor will tend to effect an equalization of temperature. If, therefore, the liquor comes from a still at a temperature approximately the boiling point of water, and if the tar is at a somewhat lower temperature, the liquor will serve to heat the tar, and vice versa.

The present process may be carried out as a cyclic process, by using the same tar over and over again for extracting phenols from the waste liquor, and by treating the tar repeatedly, between such cycles, to recover the phenols from it. The tar may, if necessary, be subjected to a dephenolizing treatment to remove phenols or tar acids therefrom, to the necessary extent, for example, by heating to a sufficiently high temperature and passing an inert gas therethrough, as disclosed in said prior application. The resulting tar which will still be at an elevated temperature can then be directly employed for extracting phenols from the hot phenol-containing liquor by bringing the liquor and tar into intimate contact in successive stages or in a countercurrent manner. The resulting tar, with the phenols which it has extracted from the liquor, will then be subjected to a further de-phenolizing treatment to remove the phenols therefrom, after which it can be used over again in a cyclic manner in the process. Tar which is initially free, or sufficiently free, from tar acids or phenols may be used without preliminary de-phenolizing treatment, and, after use subjected to such treatment, as above described.

In such a cyclic process, the de-phenolizing of the tar can be carried out by methods other than that described, e. g. under a vacuum, and without the use of an inert gas, since the tar acid oils can be distilled from the tar at a temperature considerably below their normal boiling point by the use of a high vacuum, so that the tar does not need to be heated to a high temperature. The oils removed can be freed from phenols and can in whole or in part be returned to the tar to be reused, or the process may be operated as later described herein.

Where desirable part of the tar acids may be extracted from phenol containing liquors by the process of this invention and a further extraction effected by other methods. For example I may extract 80% of the tar acid content of a weak ammonia liquor by bringing the liquor continuously into contact with tar in a countercurrent tower and then extract 15% more of the total tar acid content of the liquor by means of benzol or in any other way, thus effecting a 95% extraction.

The invention will be further described in connection with the accompanying drawing, which is of a more or less conventional and diagrammatic character, and which illustrates two forms of apparatus for carrying out the invention.

In the accompanying drawing;

Fig. 1 shows an arrangement of apparatus for removing phenols from tar with an inert gas and recovering the phenols in a caustic scrubber and for using the extracted tar in a cyclic manner for recovering phenols from phenol-containing liquors; and Fig. 2 shows a vacuum apparatus for removing phenols from the tar and for using the tar in a cyclic manner for extracting phenols from the phenol-containing liquors.

Referring first to Fig. 1, the tar supplied through line 1 may, if necessary, be heated in a heating coil 2 arranged in a suitable furnace or heating chamber 3 and is then supplied through the line 4 at an elevated temperature to the de-phenolizing tower 5 in which the tar is brought into intimate contact with hot gas flowing upwardly therethrough at a high temperature. The de-phenolized tar escapes from the bottom of the tower through the line 6 and is pumped by pump 7 through the line 8 to the top of the extraction tower 9 into which the phenol-containing liquor enters at 10. The interior construction of the tower is such as will provide intimate contact of the tar and liquor while the tar is flowing downwardly therethrough countercurrent to the upwardly flowing liquor. The extracted liquor escapes from the top of the tower at 11. The tar with the phenols extracted from the liquor escapes from the bottom of the tower through the line 12 and may be in part drawn off through the line 13 or recirculated through the line 14 by pump 14' to the heater 2 for reheating the tar if necessary before it again enters the de-phenolizing tower 5. A draw-off 15 provides for drawing off part of the tar in a de-phenolized state. If the tar is drawn off through the line 13 it will contain the phenols extracted from the liquor in the extraction tower 9.

An inert gas is supplied to the bottom of the tower 5 by means of the pump 16 through the line 17 and passes upwardly countercurrent to the downwardly flowing tar. The construction of the tower 5 is such as to bring about intimate contact of the rising gases with the subdivided tar so as to vaporize tar acids and tar acid oils from the tar. The admixed gases and vapors escape from the top of the tower 5 through the line 18 and enter the bottom of the absorption tower 19 where the tar acid vapors are brought into intimate contact with caustic to form a phenolate solution. The resulting gases and vapors, freed from phenol vapors, may be drawn off through the line 22 or recycled through the line 20 through the pump 16. Fresh gas can be added to the process through the line 21. When steam is employed as the inert gas, the tar should be preheated before it is supplied to the tower 5, or used in a sufficiently heated condition, so that it does not condense the steam, and the caustic soda scrubber should also be operated at a high temperature. When the tar is recycled and comes from the tower 9 it will be wet tar, containing more or less water, and it will be at the temperature to which it is heated or cooled by the liquor in the tower 9. This wet tar can be heated in the heater 2 sufficiently to aid in dehydrating it or to maintain it at a desired high temperature in the tower 5. Where inert gases other than steam are employed, a somewhat lower temperature may be used for the extraction of tar acids from the tar and for the recovery of these tar acids in the caustic soda scrubber.

The caustic soda scrubber 19 may be provided with fresh caustic soda solution through the line 23, and the solution drawn from the bottom of the tower is recirculated by the pump 24 through the line 25 and re-introduced into the top of the tower. The inside construction of the tower is such as to bring about intimate contact of the subdivided caustic soda solution and the upwardly flowing gases and vapors so that the tar acid vapors will be recovered and combined in the form of phenolate. The accumulated phenolate solution, when it has reached a sufficient degree of concentration, can be drawn off through the overflow 26.

In the apparatus of Fig. 2, the tar may be initially supplied through the line 30 and additional tar if needed can be supplied during the operation of the process. The tar is heated, if necessary, through the heater 31 and then enters through the line 32 to the top of the vacuum tower 33 where the tar is spread out and subjected to a vacuum to distill tar acid oils, or tar acids, therefrom. The residue flows through the line 34 to the first of a series of extraction vessels 35 from which it then flows through the line 36 to another extraction vessel 37 and then through the line 38 to a decanter 39 from which it is pumped by pump 40 through the line 41 and the heater 31 to the top of the vacuum tower 33.

The phenol-containing liquor, such as hot weak liquor containing more or less free ammonia and at a temperature of around 70 to 80° C. enters through the line 44 into the body of tar in the extraction vessel 37 through the distributing pipe 45. From the top of the vessel 37 the liquor overflows or is pumped through the line 46 through a distributing device 47 in the body of tar in the extracting vessel 35 where it is again brought into intimate contact with the tar. The extracted liquor overflows through the line 48 and may go to an ammonia still. The extraction vessels 35 and 37 are shown conventionally but it will be understood that suitable provision is made for bringing about thorough and intimate contact of the tar and liquor so as to insure extraction of the phenols from the liquor by the tar. The decanter or settling receptacle 39 permits any admixed liquor to separate from the tar and it flows back through the line 49 to the extracting vessel 37. Tar can, if desired, be drawn off from the cycle at any suitable point, such as through the line 43.

The vapors given off from the tar in the vacuum tower 33 pass through the line 50 to the caustic soda scrubber 51 where they are brought into intimate contact with a caustic soda solution. The vapors then pass through the line 52 to a condenser 53, after which the gases pass to the oil separator 54 maintained under a high vacuum, and thence to a sulfuric acid absorber 57 where any ammonia vapors are combined with sulfuric acid to form ammonium sulfate, and thence to the vacuum pump 55. The condensate collects in the receptacle 56 which is at a sufficient distance below the condenser to maintain a sufficient head of liquid. The neutral oil may be returned to the tar system through line 34', if desired, or may otherwise be disposed of.

The caustic soda scrubber 51 is provided with fresh caustic soda through the line 58, and the solution is recirculated by the pump 59 through the line 60 while part of the carbolate solution can be drawn off through the line 61.

In the operation of the processes with the apparatus illustrated in the drawing, the tar, in a heated condition, will be subjected to a de-phenolizing treatment, either in the scrubber tower 5 of Fig. 1 or the vacuum tower 33 of Fig. 2, and the tar acids will be removed therefrom to a sufficient extent so that the resulting de-phenolized tar will be an effective agent for extracting phenols from phenol-containing liquors. The tar will then be brought into intimate contact with the liquor, while both the liquor and the tar are preferably at a relatively high temperature. The phenols extracted from the liquor by the tar will be returned with the tar and reheated if necessary and then again subjected to a de-phenolizing treatment to drive off the phenols from the tar and make the tar available for further use in a cyclic manner. The phenols driven off from the tar at the outset and from any fresh tar added to the cycle, as well as the phenols extracted from the liquor by the tar and subsequently recovered therefrom, will be combined with the caustic soda in the caustic soda scrubber and obtained as a solution of sodium phenolate, from which the phenols can be set free by treatment with carbon dioxide or otherwise.

While I have referred to the use of "tar" in the process, it will be evident that, when the tar is subjected to preliminary de-phenolizing treatment, more or less of the neutral oils may be distilled from the tar with the phenol, and the de-phenolized tar may, therefore, be freed to a greater or less extent from its lower boiling constituents. The resulting tar, if maintained at an elevated temperature, will be sufficiently thin and fluid at the temperatures employed to avoid danger of thickening or solidification and to enable it to be brought into intimate contact with the hot liquor to extract phenols therefrom.

I claim:

1. The method of extracting phenols from phenol-containing liquors, which comprises bringing the liquors into intimate contact with tar of sufficiently low phenol content to extract phenols therefrom.

2. The method of extracting phenols from phenol-containing liquors, which comprises bringing the liquors into intimate contact with a heavy fraction of coke oven tar having a relatively low content of the more volatile tar acids.

3. The method of extracting phenols from phenol-containing liquors, which comprises bringing the liquors into intimate contact with tar of sufficiently low phenol content to extract a major portion of the phenols therefrom, separating the partially extracted liquors from the tar, and subjecting the liquors to further extraction of tar acids.

4. The method of extracting phenols from phenol-containing liquors, which comprises subjecting tar at an elevated temperature to a de-phenolizing distillation and bringing the resulting de-phenolized tar into intimate contact with the phenol-containing liquor.

5. The method of extracting phenols from phenol-containing liquors, which comprises subjecting tar at an elevated temperature to a de-phenolizing distillation and bringing the resulting de-phenolized tar into intimate contact with the phenol-containing liquor while both such liquor and the tar are at an elevated temperature.

6. The method of extracting phenols from phenol-containing liquors, which comprises bringing the liquor into intimate contact with de-phenolized tar, subsequently subjecting the tar to a further de-phenolizing treatment and returning the de-phenolized tar for further use in the process in a cyclic manner.

7. The method of extracting phenols from phenol-containing liquors, which comprises bringing the liquor into intimate contact with de-phenolized tar, subsequently subjecting the tar to a further de-phenolizing treatment, returning the de-phenolized tar for further use in the process in a cyclic manner, and subjecting the liquor, after separation from the tar, to further extraction of tar acids.

8. The method of extracting phenols from phenol-containing liquors with hot tar, which comprises subjecting the tar to a de-phenolizing treatment, bringing the hot de-phenolized tar into intimate contact with hot phenol-containing liquor, and subsequently subjecting the hot tar to a de-phenolizing treatment to remove phenols therefrom by distillation, and returning the resulting tar for further use in the process.

9. The method of extracting phenols from phenol-containing liquors with hot tar, which comprises subjecting the tar to distillation with an inert gas at a sufficiently high temperature to distill phenols therefrom, recovering the phenols from the resulting gases and vapors, bringing the hot de-phenolized tar into intimate contact with hot phenol-containing liquor to extract phenols therefrom, subjecting the resulting tar to further distillation with an inert gas to distill phenols therefrom and make the tar available for further extraction of phenol-containing liquor, and utilizing the same hot tar repeatedly in the process.

10. The method of extracting phenols from phenol-containing liquors, which comprises bringing hot phenol-containing liquors into intimate contact with hot de-phenolized tar to extract phenols from the liquor by the tar, subjecting the resulting tar to distillation under a vacuum to remove phenols therefrom, and returning the de-phenolized tar for further extraction of phenol-containing liquor, the phenol-containing liquor being supplied at an elevated temperature, and the hot tar being maintained at a sufficiently high temperature during the vacuum distillation to insure removal of phenols therefrom.

11. The method of extracting phenols from phenol-containing liquors, which comprises bringing hot phenol-containing liquors into intimate contact with hot de-phenolized tar to extract phenols from the liquor by the tar, subjecting the resulting tar to distillation under a vacuum to remove phenols therefrom, and returning the de-phenolized tar for further extraction of phenol-containing liquor.

12. The method of extracting phenols from phenol-containing liquors with tar, which comprises dephenolizing tar, bringing the dephenolized tar into contact with the phenol-containing liquor to extract phenols therefrom, subjecting the resulting tar to distillation with an inert gas including steam to distill phenols therefrom and make the tar available for further extraction of phenol-containing liquor, and using the same tar repeatedly in the process.

13. The method of extracting phenols from phenol-containing liquors, which comprises bringing the liquor into intimate contact with dephenolized tar, heating the resulting tar and subjecting it to a dephenolizing distillation.

14. The method of extracting phenols from phenol-containing liquors, which comprises bringing the phenol-containing liquor into contact with tar so as to extract phenols from the liquor by the tar, subjecting the resulting tar to dephenolization by a cyclic process in which the phenols are vaporized in a current of inert gases and then recovering phenols from the gas by extraction with an alkaline reagent, at least a portion of the resulting extracted gas being returned for further dephenolization of the tar and using the same tar repeatedly in the process.

15. The method of extracting phenols from phenol-containing liquors with tar, which comprises heating the tar, bringing the hot tar into contact with hot phenol-containing liquor to extract phenols therefrom, subjecting the resulting tar to distillation with an inert gas to distill phenols therefrom, thereby making the tar available for further extraction of phenol-containing liquor, recovering tar acids from the resulting vapors by direct contact with an alkaline reagent without effecting substantial condensation of the vapors, recycling the resulting inert gases and re-using the tar after this dephenolization for further extraction of tar acids from the phenol-containing liquor.

16. The method of extracting phenols from phenol-containing liquors which comprises bringing the liquors into contact with tar of sufficiently low phenol content to extract phenols therefrom by causing the tar and liquors to flow in opposite directions and thus causing transfer of tar acids from the liquors to the tar.

17. The cyclic method of extracting phenols from phenol-containing liquors which comprises removing tar acids from tar, bringing the treated tar into intimate contact with the liquors so as to dissolve phenol from the liquors and repeating these steps.

18. The method of reducing the phenol content of a phenol-containing liquor which comprises contacting the liquor with a material from the group consisting of tars, tar distillation residues and tar distillates, then separating from the liquor the material contacted therewith.

19. The method of reducing the phenol content of a phenol-containing liquor, which comprises distilling off a tar acid oil from tar and bringing the tar distillation residue into contact with the liquor, then separating the liquor from the residue by decantation.

20. The method of reducing the phenol content of a phenol-containing liquor, which comprises distilling off a tar acid oil from tar, removing phenols from the tar acid oil, bringing the oil into contact with the liquor, and then separating the oil from the liquor by decantation.

21. The method of extracting a phenol from a phenol-containing liquor with hot tar, which comprises subjecting the tar to vacuum distillation at a sufficiently high temperature to distill a phenol therefrom, bringing the hot dephenolized tar into intimate contact with the hot phenol-containing liquor to extract a phenol therefrom, separating the liquor from the tar and subjecting the tar to further vacuum distillation to distill the phenol therefrom and make the tar available for further extraction of phenol-containing liquor, and bringing the resultant dephenolized tar into contact with further quantities of phenol-containing liquor for extraction of a phenol therefrom.

S. P. MILLER.